US009264309B2

(12) United States Patent
Jian et al.

(10) Patent No.: US 9,264,309 B2
(45) Date of Patent: Feb. 16, 2016

(54) ENABLING CLUSTER SCALING (75) Inventors: Li Rong Jian, Beijing (CN); Jie Qiu, Beijing (CN); Jie Y. Yang, Beijing (CN); Tao Yu, Beijing (CN); Xiao Zhong, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 152 days.

(21) Appl. No.: 13/551,283

(22) Filed: Jul. 17, 2012

(65) Prior Publication Data
US 2013/0024551 A1 Jan. 24, 2013

(30) Foreign Application Priority Data

Jul. 22, 2011 (CN) .......................... 2011 1 0212595

(51) Int. Cl.
*G06F 15/177* (2006.01)
*H04L 12/24* (2006.01)
*H04L 29/08* (2006.01)

(52) U.S. Cl.
CPC ........ *H04L 41/0843* (2013.01); *H04L 41/0846* (2013.01); *H04L 41/0893* (2013.01); *H04L 67/10* (2013.01)

(58) Field of Classification Search
CPC ............ H04L 41/0893; H04L 41/0806; H04L 41/084; H04L 41/086; G06F 15/177
USPC .......................................... 709/220; 715/700
See application file for complete search history.

(56) References Cited

U.S. PATENT DOCUMENTS

| 7,325,097 | B1 * | 1/2008 | Darcy ........................... 711/117 |
| 7,587,475 | B2 * | 9/2009 | Koneru ......................... 709/221 |
| 2002/0186827 | A1 * | 12/2002 | Griffiths ................... 379/207.02 |
| 2005/0138557 | A1 * | 6/2005 | Bolder et al. ................. 715/700 |
| 2006/0037016 | A1 * | 2/2006 | Saha et al. .................... 717/178 |

(Continued)

FOREIGN PATENT DOCUMENTS

| CN | 101256495 | 9/2008 |
| WO | WO2009/132272 | 10/2009 |

OTHER PUBLICATIONS

Kaul et al., "POSAML: A Visual Modeling Framework for Middleware Provisioning", 40th Annual Hawaii International Conference on System Sciences (HICSS'07); http://doi.ieeecomputersociety.org/10.1109/HICSS.2007.438.

(Continued)

*Primary Examiner* — Kevin Bates
*Assistant Examiner* — Chen-Liang Huang
(74) *Attorney, Agent, or Firm* — Scully, Scott, Murphy & Presser, P.C.; Jennifer Davis, Esq.

(57) ABSTRACT

Embodiments of the present invention relate to methods and apparatuses for enabling cluster scaling. Specifically, there is disclosed a method of recording a context of configuration for an initial node of a cluster, comprising: retrieving at least one file to be used for configuring the initial node; and recording a context while configuring the initial node using the at least one file, the recorded context being information on the configuration of the initial node and to be used for enabling addition of a new node into the cluster. There is also disclosed a method of enabling addition of a new node into a cluster. Corresponding apparatuses are also disclosed. According to embodiments of the present invention, the efficiency of improving cluster scaling may be effectively improved.

15 Claims, 6 Drawing Sheets

(56) References Cited

U.S. PATENT DOCUMENTS

| | | | |
|---|---|---|---|
| 2007/0174336 A1* | 7/2007 | Day et al. | 707/104.1 |
| 2008/0065993 A1 | 3/2008 | Huang | |
| 2008/0209016 A1 | 8/2008 | Karve et al. | |
| 2008/0239985 A1 | 10/2008 | Karve et al. | |
| 2008/0263183 A1* | 10/2008 | Nishiyama et al. | 709/220 |
| 2010/0198971 A1 | 8/2010 | Callaway et al. | |
| 2010/0262948 A1* | 10/2010 | Melski et al. | 717/101 |
| 2012/0033139 A1* | 2/2012 | Guo et al. | 348/726 |
| 2013/0060810 A1* | 3/2013 | Maman | G06F 17/3048 707/769 |

OTHER PUBLICATIONS

Mazzucci et al., "Engineering Distributed Shared Memory Middleware for Java", R. Meersman, T. Dillon, P. Herrero (Eds.): OTM 2009, Part I, LNCS 5870m pp. 531-548, 2009, (c) Springer-Verlag Berlin Heidelberg 2009; http://math.ut.ee/~mazzucco/papers/dsm.pdf.

* cited by examiner

ENABLING CLUSTER SCALING

CROSS-REFERENCE TO RELATED APPLICATIONS

The present invention relates to and claims the benefit of the filing date of commonly-owned, co-pending Chinese Patent Application No. CN 201110212595.3, filed Jul. 22, 2011, the entire contents and disclosure of which is incorporated by reference as if fully set forth herein.

FIELD OF THE INVENTION

Embodiments of the present invention generally relate to the field of information technology, and more particularly, relates to methods and apparatuses for enabling cluster scaling.

BACKGROUND

With the constant development of computing technology, a computer cluster system (or called briefly as a cluster) has become an important computing mode or system. A cluster is generally composed of a set of nodes that communicate with each other. These nodes cooperate on software and/or hardware levels to collaboratively carry out a computing task. It should be noted that in the context of the present application, the nodes in a cluster may be physical nodes like different physical computing devices, or virtual nodes like a plurality of virtual machines VM on a same physical computing device. The nodes in the cluster may communicate with each other through various proper means, including but not limited to a local area network (LAN), a wide area network (WAN), an IP protocol-based network (for example, Internet), a peer to peer network (for example, an ad hoc peer network), cellular communication, RF communication, Bluetooth communication, process/inter-process communication, etc.

An important factor for measuring the performance of a cluster is whether the cluster may be scaled effectively and dynamically. When a cluster is initially constructed and deployed, it may have n nodes (n is an integer) to perform a computing task. However, with the running of the cluster, the demands of computing tasks may increase. At this point, it is often required to add new node(s) into the cluster. Therefore, the new node should be properly configured according to the functionality and state of the cluster, and it is usually necessary to copy one or more files from a source external to the node for tasks such as installing or setting. In the prior art, such a configuration often consumes lots of time resources and computing resources.

In order to further explain this problem, a cluster comprising a plurality of virtual machines on a same physical machine is taken as an example. In order to add a new node (in this example, it is a new virtual machine) to the cluster, for example, it is generally required to perform the following configurations in sequence: obtaining and installing an operating system (OS) mirror, a middleware required for implementing functions of the cluster, and running user applications on the virtual machine, etc. With the middleware as an example, in the prior art, obtaining and installing a middleware always needs copying required files from a central repository to a local space of the VM, and then installing and configuring the middleware on the OS mirror using these files. Then the middleware may be initiated and the user-level applications may be deployed thereon. It may be understood that when the number of files is too much or the size of a file is too large, the above process will consume considerable processing time.

Further, in the prior art, in order to install an application on a new node, all files related to the application are usually copied from the central repository to the node, and then the actual installation process can be started. However, some files may be useless for node configuration, which causes waste of resources. Additionally, copying files is generally performed in sequence. However, some files may not have dependencies. As a result, the potential concurrency may not be effectively utilized. It may be further understood that, in order to configure a new node, it is likely needed to install a plurality of applications on the new node, which requires a plurality of files to be obtained for installing each application. This inevitably makes the file repository and communication channel, among other things, become bottleneck resources of the system. These problems further dampen the efficiency of cluster scaling.

Considering a specific example, when it is needed to configure a Websphere™ Application of the International Business Machine Corporation (IBM) on a virtual machine node, according to the prior art, it takes 10 minutes or longer to copy the required files from the central repository. It should be noted that although the above depiction is given with reference to a virtual machine, similar problems likewise exist in scaling a physical cluster.

In order to improve the efficiency of cluster scaling, it has been proposed to only perform "pseudo" configuration when a new node is to be added into the cluster. In other words, when a new node is added to the cluster, rather than actually copying and installing the required applications to the node and/or performing corresponding configurations, any operation is performed only when it is actually required at runtime (for example, copying a file from the central repository and locally installing it). Although such solutions may improve the speed of adding a new node into a cluster, it only postpones the time required for configuring a new node and resource overhead to the running time. Many of above-mentioned problems such as sequential access and bottleneck resource are not actually solved.

SUMMARY

In view of the above problems existing in the prior art, it is desirable for a novel solution that more effectively scales a cluster. Therefore, the embodiments of the present invention provide methods and apparatuses that enable efficient scaling of cluster.

According to one aspect of the present invention, there is provided a method of recording a context of configuration for an initial node of a cluster, comprising: retrieving at least one file to be used for configuring the initial node, and recording a context while configuring the initial node using the at least one file, the recorded context being information on the configuration of the initial node and to be used for enabling addition of a new node into the cluster.

According to another aspect of the present invention, there is provided a method of enabling addition of a new node into a cluster, comprising: accessing a context of an existing node of the cluster, the context being information on a configuration of the existing node while being added into the cluster; and retrieving at least one file according to the context, wherein the at least one file is to be used for configuring the new node.

According to another aspect of the present invention, there is provided an apparatus for recording a context of configuration for an initial node of a cluster, comprising: retrieving means configured to retrieve at least one file to be used for configuring the initial node; and recording means configured to record a context while configuring the initial node using the at least one file, the recorded context being information on the configuration of the initial node and to be used for enabling addition of a new node into the cluster.

According to another aspect of the present invention, there is provided an apparatus for enabling addition of a new node into a cluster, comprising: accessing means configured to access a context of an existing node of the cluster, the context being information on a configuration of the existing node while being added into the cluster; and retrieving means configured to retrieve at least one file according to the context, wherein the at least one file is to be used to configure the new node.

According to embodiments of the present invention, when a first node is added into the cluster, it retrieves files from a file repository of a cluster to perform configuration. However, it differs from the prior art in that the first node will record a context regarding its configuration. Then, when a new node is to be added into the cluster, it may obtain more knowledge about the configuration through accessing the context of the existing nodes. In this way, the new node may not only retrieve the required files from a central file repository, but may also retrieve files from one or more existing nodes. Therefore, it may effectively solve the contention and low efficiency problems caused by bottleneck resources. In some embodiments, a context may indicate the dependencies of a file. Thus, the new node may concurrently retrieve files without a dependency from the central repository and existing nodes and/or streamline the configuration process. Additionally, in some embodiments, a subsequent node may likewise record its context, such that the subsequent node may access a context and retrieve files from more than one existing node. Further, communication between nodes may be implemented through a peer-to-peer (P2P) communication. Through these embodiments, the efficiency of cluster scaling may be further improved.

BRIEF DESCRIPTION OF THE DRAWINGS

Through reading the following detailed description with reference to the accompanying drawings, the above and other objective, features and advantages of the embodiments of the present invention will become more comprehensible. In the drawings, a plurality of embodiments of the present invention will be illustrated in an exemplary and non-limiting manner, wherein.

DETAILED DESCRIPTION OF THE INVENTION

Now embodiments of the present invention will be described in detail with reference to the drawings. As briefly indicated above and discussed in detail below, according to the embodiments of the present invention, when an initial node is added into a cluster, it retrieves required files and performs configuration. Different from the prior art, the node records its context during the configuration for later use by other subsequent nodes. In this way, when a new node is to be added into a cluster, it may retrieve and make reference to these contexts, so as to perform cluster scaling quickly and efficiently. Moreover, as discussed in detail hereinafter, any new node that is added into a cluster may record its own context. In this way, with the increase of node number, the efficiency of cluster scaling will be improved accordingly.

Figure 1:
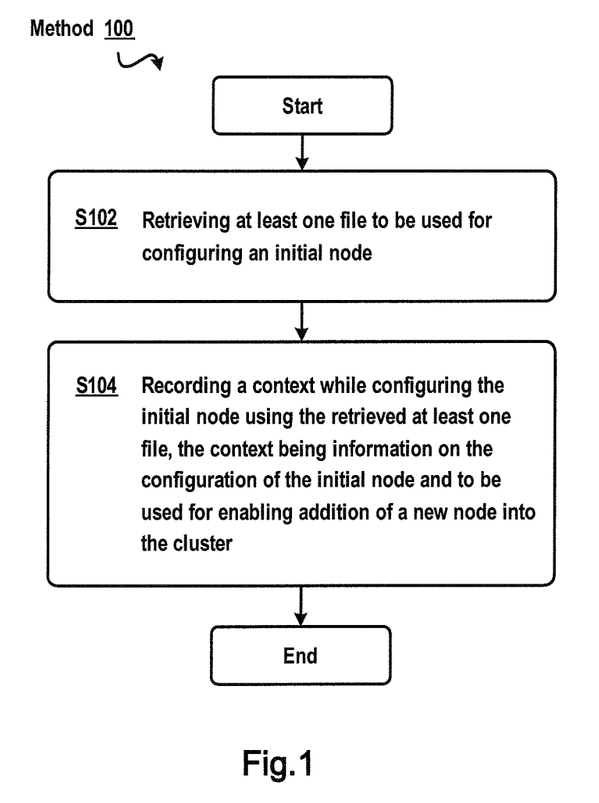
FIG. 1 illustrates a flow chart of a method 100 of recording a configuration context of an initial node of a cluster according to embodiments of the present invention.

Hereinafter, the spirits and principles of the present invention will be illustrated through describing a plurality of embodiments of the present invention. First, referring to FIG. 1, FIG. 1 illustrates a flow chart of a method 100 of recording a configuration context of an initial node of a cluster according to embodiments of the present invention. It is noted that the method 100 may comprise an additional step and/or omit implementation of an illustrated step. The scope of the present invention is not limited in this regard.

According to the embodiments of the present invention, the method 100 may be performed by the first node or initial node added into the cluster. After the start of method 100, at step S102, at least one file to be used for configuring the initial node is retrieved.

As mentioned above, in order to make a physical or virtual computing device become a node of a cluster, it is necessary to configure the node according to the function, requirement, and property of the cluster. The term "configuration" as used here includes but not limited to one or more operations as follows: installing an application on a node, setting and modifying parameters of the node, enabling and/or disabling an existing application on the node, and any other proper operation. While configuring the node, it is generally required to copy at least one file from a source external to the node.

According to embodiments of the present invention, the files may be retrieved from a file repository associated with the cluster. Specifically, each cluster may have one or more file repositories associated therewith, with each file repository storing files or file mirrors that are required for configuring a node of the cluster. For example, the files stored in a file repository may include, but not limited to, one or more of the following: files for installing and configuring a virtual machine application, OS mirror files, files for installing and configuring a middleware, files for installing and configuring a user application, profile files used in configuring a node, and any other files associated with configuration of the node.

The file repository is accessible by an existing node in the cluster and the node to be added into the cluster. At step S102, the initial node (i.e., the first node of the cluster) to be added into the cluster may access a file repository associated with the cluster through various communication mechanisms. These communication mechanisms include, but not limited to, one or more of the following: a local area network (LAN), a wide area network (WAN), an IP protocol-based network (for example, Internet), a peer-to-peer network, cellular communication, RF communication, Bluetooth communication, process/inter-process communication, etc.

The retrieved files may be used to configure the initial node according to the function and requirement of the cluster, for example, installing an application on the initial node, modifying settings of the initial node, etc. It should be noted that using the retrieved files to configure a node is not necessarily performed by the method 100. Instead, it may be implemented by other means/process on the node via any proper technical means that is currently known or future developed.

Next, the method 100 proceeds to step S104 to record a context in the process of configuring the initial node using the at least one file retrieved at step S102, wherein the recorded context is the information on the configuration of the initial node and to be used for enabling addition of a new node into the cluster.

According to embodiments of the present invention, the term "context" as used here comprises information on the configuration of a node. The context may be regarded as a metadata. According to embodiments of the present invention, the context may comprise, but not limited to, one or more of the following: identifications of files that are required for configuring a node, execution sequence of files, storage location of each file on a node and/or in a central file repository, dependencies of files (i.e., whether a file is executed dependent on execution of a preceding file), data related to the configuration (for example, storage location of data), basic system setting required for configuration, and communication setting (for example, network port setting), etc.

At step S104, a context of the initial node may be recorded in any proper manner. For example, according to embodiments of the present invention, the context may be stored in a database, a structural file drafted written in an extensible mark language (XML), a flat file, or any proper data structure. Additionally, according to some embodiments of the present invention, at step S104, the context may be recorded at the initial node. Alternatively or additionally, in some other embodiments of the present invention, there may be one or more context repositories associated with the cluster that are dedicated to storing the context of one or more nodes in the cluster. In these embodiments, at step S104, the initial node may record its context into the context repository associated with the cluster. It should be noted that the context may be organized in a variety of manners in the context repository. For example, the context repository may record context per nodes, or uniformly record and manage the contexts for all nodes. The scope of the present invention is not limited in this regard.

The method 100 ends after completion of step S104. Through executing the method 100 by an initial node to be added into a cluster, the initial node may record its context in the process of addition into the cluster. It should be understood that configurations for various different nodes in a same cluster are isomorphic in general. In other words, the files required for configuring a subsequent node, execution sequences of these files, and their dependencies are identical or at least similar to those of the initial node. Therefore, the context that is recorded by the initial node of the cluster (or more generally, a node previously added into the cluster) may be referred by the subsequent nodes and may be used to expedite cluster scaling, which will be described in detail with reference to FIG. 2. Of course, it should be noted that isomorphism of node configurations are not limitation to the scope of the present invention. In fact, those skilled in the art will understand that embodiments of the present invention are likewise applicable for isomorphic node configurations.

Figure 2:
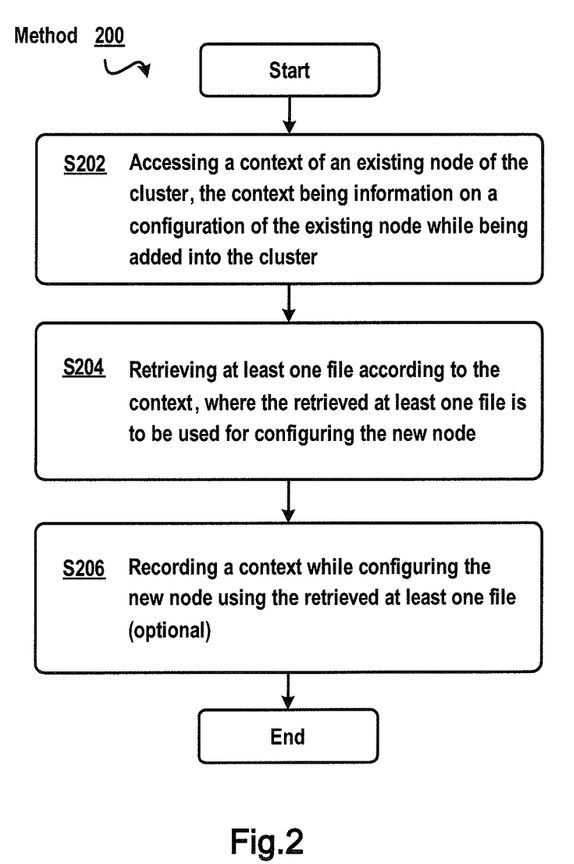
FIG. 2 illustrates a flow chart of a method 200 of enabling addition of a new node into a cluster according to embodiments of the present invention.

Now reference is made to FIG. 2, which illustrates a flow chart of a method 200 of enabling addition of a new node into a cluster according to embodiments of the present invention. Similar to the method 100 as described above, the steps as described in method 200 may be executed in different order and/or concurrently. The method 200 may comprise an additional step and/or omit the execution of an illustrated step. The scope of the present invention is not limited in this regard. According to embodiments of the present invention, the method 200 may be performed by a node that is to be added into a cluster other than an initial node. In other words, before the node that performs method 200 is added into the cluster, the cluster already has at least one existing node.

After the method 200 starts, at step S202, a context of an existing node is accessed, the context comprising information on the configuration of the existing node while being added into the cluster. According to some embodiments of the present invention, as mentioned above, the existing node may record its context into one or more context repositories associated with the cluster. In these embodiments, at step S202, the new node may access the context from a context repository associated with the cluster. Alternatively or additionally, the existing node may also store the context locally. Accordingly, at step S202, the new node may access the context from a corresponding existing node.

Next, the method 200 proceeds to step S204, where at least one file is retrieved according to the context accessed at step S202. The retrieved file will be used to configure this new node. According to embodiments of the present invention, as mentioned above, the context may indicate identifications of files that are required to configure a cluster node and the execution sequences of the files. At this point, through accessing the context of the existing node, the new node may determine which file or files should be retrieved first. Thus, the new node may retrieve the files from the file repository according to the execution sequences of files, without copying all files as in the prior art. In this way, the new node may initiate the execution of retrieved files while continuously retrieving other files, thereby effectively improving the configuration speed.

Besides, according to some embodiments of the present invention, the context may indicate the dependencies of files required for configuring the node. In these embodiments, based on identifications of files, execution sequences, and dependencies, the configuration process may be divided into a plurality of logical stages. As an example, in some embodiments, node configuration may be logically divided into three states: a stage of retrieving files, a stage of executing files, and a stage of recording contexts. At this point, configuring a new node may be performed on the basis of "stage." For example, a new node may first retrieve a first file required for configuration, and then retrieve a next required file while executing the configuration related to the first file, wherein the second file is independent of the first file. The new node may execute the configuration related to the second file and retrieve the third file while recording the configuration context related to the first file, and so forth. In this way, the configuration of the new node is streamlined, such that the configuration efficiency is improved while guaranteeing the correctness of operation.

Moreover, according to embodiments of the present invention, besides the above information, the context of the existing node may also indicate the storage location of a required file on the existing node. Therefore, in addition to retrieving files a file repository of the cluster or alternatively, the new node may retrieve relevant files from one or more existing nodes of the cluster in view of the storage location indicated by the context. Moreover, in some embodiments, the new node may concurrently retrieve files from the existing node of the cluster and/or a file repository associated with the cluster. In this way, the contention on the file repository which is a collective resource and the potential delay incurred by waiting may be effectively alleviated.

In particular, according to some embodiments of the present invention, the new node may dynamically determine the source or sources from which the files are retrieved. It should be understood that the "source" here may comprise an existing node that has been previously added into the cluster, as well as the file repository of the cluster. For example, the new node may concurrently issue a file retrieval request to the file repository and one or more existing nodes and actually retrieve files from the source that first responds to the request. Alternatively or additionally, such determination may also be made based on various factors, such as current load of the existing node and file repository, communication state, and waiting queue length, etc. It should be noted that it is merely exemplary, not intended to limit the protection scope of the present invention. Actually, according to the embodiments of the present invention, various relevant factors may be included within the scope of consideration, and the scope of the present invention is not limited in this regard.

Additionally, according to some embodiments of the present invention, the nodes in a cluster may communicate with each other by adopting a peer-to-peer (P2P) network. More specifically, the new node may access the context from the existing node and/or retrieves the files required for configuration from the existing node through P2P communication. Therefore, the pressure from the collective resource and bottleneck communication resource in the cluster may be relieved, with the cluster scaling efficiency being improved.

Next, according to some embodiments of the present invention, the method 200 proceeds to step S206 where the context of configuration of the new node using the retrieved at least one file is recorded. In these embodiments, when a new node to be added into a cluster is being configured, it may record its context, just like the initial node of the cluster (see step S104 in FIG. 1 as above depicted). As above mentioned, the information that may be indicated by the context includes, but not limited to, one or more of the following: identifications of the documents required for configuring the node, executing sequences of files, storage location of each file on the node and/or central file repository, dependencies of files, etc.

The context of the new node may be recorded by means of any suitable data structure, for example, database, XML file, flat file, etc. Moreover, according to some embodiments of the present invention, at step S206, the context may be recorded at the new node or stored in a context repository associated with the cluster.

By performing step S206, any new node that is added into the cluster may record the context of its configuration. In this way, the subsequent node may not only access the context and/or retrieve files from an initial node of the cluster, but also may perform the above operations from another existing node that has been previously added into the cluster. Therefore, with the increase of the number of existing nodes in the cluster, the newly added node may access the context and retrieve files from more and more sources. This may further significantly improve the speed of cluster scaling.

However, it should be understood that step S206 is optional. Actually, according to embodiments of the present invention, any node other than the initial one does not necessarily record its configuration context. According to embodiments of the present invention, a new node that is added into the cluster may determine whether to record its context based on various factors such as its own computing capacity, storage capacity, current state of the cluster system, the state of the context repository and/or file repository, etc.

Figure 3:
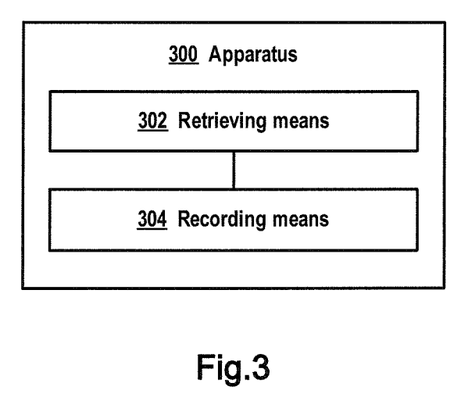
FIG. 3 illustrates a block diagram of an apparatus 300 for recording a configuration context of an initial node of a cluster according to embodiments of the present invention.

Now reference is made to FIG. 3 that illustrates a block diagram of an apparatus 300 for recording a context of configuration for an initial node of a cluster according to embodiments of the present invention. The apparatus 300 may reside in the initial node that is to be added into the cluster or otherwise be associated with the initial node, and may be configured to carry out the above described method 100.

As illustrated in FIG. 3, the apparatus 300 comprises retrieving means 302 configurable to retrieve at least one file to be used for configuring the initial node. The apparatus 300 further comprises recording means 304 configurable to record a context while configuring the initial node using the at least one file, the recorded context being information on the configuration of the initial node and to be used for enabling addition of a new node to the cluster. In addition, according to some embodiments of the present invention, the recording means 304 may further comprise at least one of: first recording means configurable to record the context at the initial node; and second recording means configurable to record the context in a context repository associated with the cluster.

Figure 4:
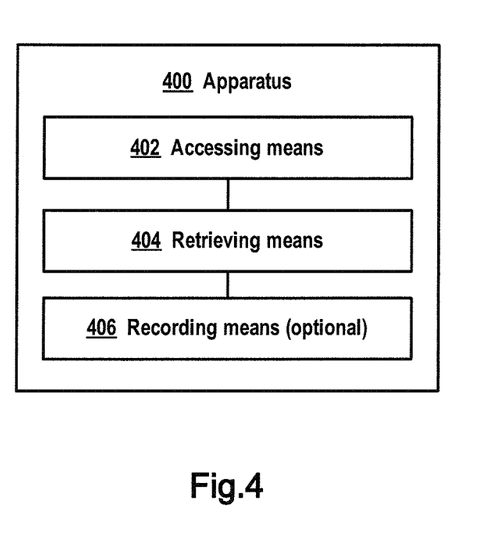
FIG. 4 illustrates a block diagram of an apparatus 400 for enabling addition of a new node into a cluster according to embodiments of the present invention.

FIG. 4 illustrates a block diagram of an apparatus 400 for enabling addition of a new node into a cluster according to embodiments of the present invention. The apparatus 400 may reside in a new node added into the cluster except the initial node or be associated with it in other manner, and may be configured to perform the above described method 200.

As illustrated in the figure, according to embodiments of the present invention, the apparatus 400 comprises accessing means 402 configurable to access a context of an existing node of the cluster, the context being information on the configuration of the existing node while being added into the cluster. The apparatus 400 further comprises retrieving means 404 configurable to retrieve at least one file according to the context, wherein the at least one file is to be used for configuring the new node.

According to some embodiments of the present invention, the accessing means 402 may further comprise first accessing means configurable to access the context from a context repository associated with the cluster. Further, according to some embodiments of the present invention, the accessing means 402 further comprises: second accessing means configurable to access the context from the corresponding existing node.

According to some embodiments of the present invention, the retrieving means 404 may further comprise at least one of: first retrieving means configurable to retrieve the at least one file from an existing node of the cluster; and second retrieving means configurable to retrieve the at least one file from a file repository associated with the cluster. Alternatively or additionally, the retrieving means 404 may further comprise third retrieving means configurable to currently retrieve the at least one file.

Additionally, according to some embodiments of the present invention, the apparatus 400 may further comprise recording means 406 configurable to record the content while configuring the new node using the retrieved at least one file. According to some embodiments, the recording means 406 may further comprise at least one of: first recording means configurable to record the context at the new node; and second recording means configurable to record the context in a context repository associated with the cluster. It should be noted that, as disclosed above with reference to FIG. 2, the recording means 406 is optional, not an essential component of the apparatus 400.

It should be understood that respective means comprised in apparatus 300 and apparatus 400 as described above with reference to FIG. 3 and FIG. 4, as well as the optional sub-means comprised therein, correspond to respective steps in method 100 as described above with reference to FIG. 1 and method 200 as described above with reference to FIG. 2. Thus, all of the above features and operations as described for method 100 and method 200 are likewise applicable to apparatus 300 and apparatus 400, which thus will not be detailed here.

In particular, the partition of means and optional means in apparatuses 300 and 400 are exemplary, not limitative. For example, the function of a single means as illustrated in FIG. 3 and FIG. 4 may be implemented by a plurality of means. In turn, the plurality of means as illustrated in FIG. 3 and FIG. 4 may be implemented by a single means. The scope of the present invention is not limited in this regard.

It should be understood that respective means and sub-means comprised in apparatuses 300 and 400 may be implemented in various manners, comprising software, hardware, firmware, or any combination thereof. For example, in some embodiments, respective means in apparatuses 300 and 400 may be implemented using software and/or firmware modules. Alternatively or additionally, respective means of apparatus 300 and apparatus 400 may also be implemented by hardware module. For example, respective means of apparatuses 300 and 400 may be implemented as an integrated circuit (IC) chip or dedicated integrated circuit (ASIC). Respective means in apparatuses 300 and 400 may be implemented as a system-on-chip (SOC). Other manners that are currently known or developed in the future are also feasible, and the scope of the present invention is not limited in this regard.

Figure 5:
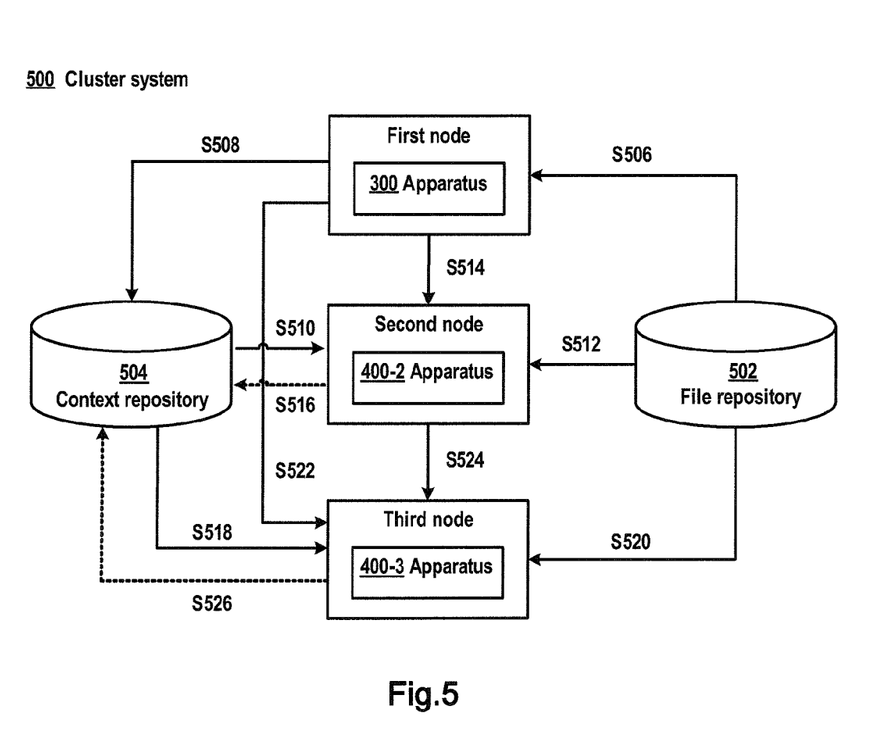
FIG. 5 illustrates a block diagram of a cluster system 500 in which the embodiments of the present invention may be implemented.

Now, referring to a cluster system 500 in which the embodiments of the present invention may be implemented, as shown in FIG. 5, the working principle of the embodiments of the present invention will be further illustrated. As shown in FIG. 5, the cluster system 500 comprises a file repository 502 for storing the files that are required for configuring a node of the cluster. In the example of FIG. 5, the cluster system 500 further comprises a context repository 504 for storing the context recorded by the node. It should be noted that the context repository 504 may be omitted in other embodiments, because the content may be recorded at the node.

In the example as illustrated in FIG. 5, three exemplary nodes are illustrated, namely, the first node, second node, and third node. The first node is the initial node of the cluster system 500, and the second node and the third node are subsequently added nodes of the cluster system 500. As illustrated, an instance of apparatus 300 as described above with reference to FIG. 3 resides at the first node 500. Moreover, the instances 400-2 and 400-3 of the apparatus as described above with reference to FIG. 4 reside at the second node and the third node, respectively.

In the operation, the first node is initially added into the cluster. As described above, the apparatus 300 that resides at the first node may retrieve from a file repository 502 the files that are required for configuring (S506), wherein these files will be used to configure the first node. During this period, the apparatus 300 records the context regarding configuration of the first node into the context repository (S508).

Then, when the second node is to be added into the cluster, as above mentioned, the apparatus 400-2 residing at the second node may access the context repository 504 (S510), so as to obtain the context of the existing node (in this case, the first node). According to this context, the apparatus 400-2 may allow the second node to retrieve files (S512, S514) from at least one of the file repository 502 or from the first node. It may effectively accelerate the configuration of the second node to enable it to be added into the cluster quickly. Moreover, according to some embodiments of the present invention, the second node may alternatively store the context during its configuration into the context repository 504 (S516).

Likewise, when the third node is to be added into the cluster, through accessing the context repository 504 (S518), the third node may retrieve the required file (S520, S522, S524) from at least one of the file repository 502, the first node, and the second node. Particularly, the third node may record its context in the repository 504 for future user (S526). Those skilled in the art may understand that with the increase of the node number, the efficiency of adding subsequent nodes into the cluster will be increasingly improved.

Figure 6:
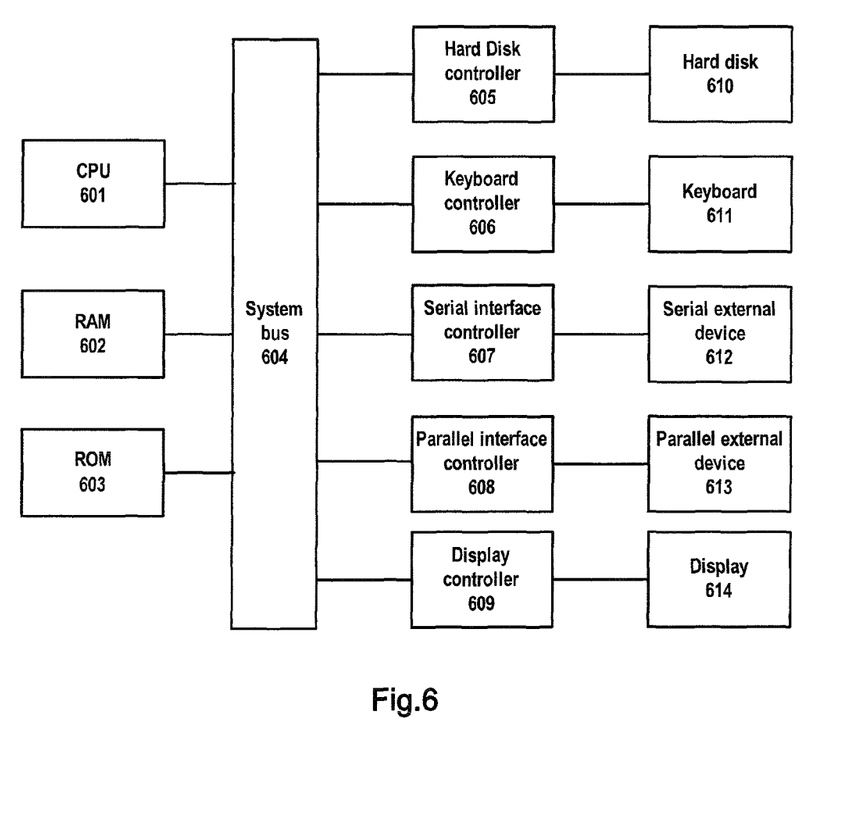
FIG. 6 illustrates a block diagram of an exemplary computing system 600 that is adapted to implement the embodiments of the present invention.

Now the reference is made to FIG. 6 where a schematic block diagram of a computer system 600 that is adapted to implement the embodiments of the present invention is illustrated. The computer system as shown in the figure includes a CPU (Central Processing Unit) 601, a RAM (Random Access Memory) 602, a ROM (Read Only Memory) 603, a system bus 604, a hard disk controller 605, a keyboard controller 606, a serial interface controller 607, a parallel interface controller 608, a monitor controller 609, a hard disk 610, a keyboard 611, a serial peripheral device 612, a parallel peripheral device 613 and a monitor 614. Among these components, connected to the system bus 604 are the CPU 601, the RAM 602, the ROM 603, the hard disk controller 605, the keyboard controller 606, the serial interface controller 607, the parallel interface controller 608 and the monitor controller 609. The hard disk 610 is coupled to the hard disk controller 605; the keyboard 611 is coupled to the keyboard controller 606; the serial peripheral device 612 is coupled to the serial interface controller 607; the parallel peripheral device 613 is coupled to the parallel interface controller 608; and the monitor 614 is coupled to the monitor controller 609. It should be understood that the structural block diagram in FIG. 6 is shown only for illustration purpose, and is not intended to limit the scope of the present invention. In some cases, some devices may be added or reduced as required.

The embodiments of the present invention may effectively improve the efficiency of improving cluster scaling. For example, still consider the example as above mentioned, i.e., installing and configuring WAS in order to add a new virtual machine node into the cluster. As mentioned above, according to the method in the prior art, this process needs to take more than 10 minutes. In contrast, under the condition of identical software and hardware facilities, using the embodiments of the present invention, it at most takes 3 minutes to implement the process of adding the new node into the cluster.

The spirit and principle of the present invention has been illustrated above through a plurality of preferred embodiments of the present invention. It is noted that, each block in the flowcharts or block may represent a module, a program segment, or a part of code, which contains one or more executable instructions for performing specified logic functions. It should be further noted that, in some alternative implementations, the functions noted in the blocks may also occur in a sequence different from what is noted in the drawings. For example, two blocks shown consecutively may be performed in parallel substantially or in an inverse order. It should also be noted that each block in the block diagrams and/or flow charts and a combination of blocks in block diagrams and/or flow charts may be implemented by a dedicated hardware-based system for executing a prescribed function or operation or may be implemented by a combination of dedicated hardware and computer instructions.

The method and apparatus according to embodiments of the present invention may employ a form of complete hardware embodiments, complete software embodiments, or both. In a preferred embodiment, the present invention is implemented as software, including, without limitation to, firmware, resident software, micro-code, etc.

Particularly, besides the hardware embodiments, embodiments of the present invention may be implemented in the manner of a computer program product. For example, the method 100 as described with reference to FIG. 1 and the method 200 that is described with reference to FIG. 2 may be implemented through a computer program product. This computer program product may be stored in RAM 604, ROM 604, hard disk 610 and/or any suitable storage medium as illustrated in FIG. 6, or downloaded to the computing system 600 from a suitable location in the network. The computer program product may comprise a computer code portion comprising a program instruction that may be executed through a suitable processing device (for example, CPU 601 in FIG. 6), where the program may implement the steps of methods 100 and 200 when being executed.

Moreover, the present invention may be implemented as a computer program product usable from computers or accessible by computer-readable media that provide program code for use by or in connection with a computer or any instruction executing system. For the purpose of description, a computer-usable or computer-readable medium may be any tangible means that can contain, store, communicate, propagate, or transport the program for use by or in connection with an instruction execution system, apparatus, or device.

The medium may be an electric, magnetic, optical, electromagnetic, infrared, or semiconductor system (apparatus or device), or propagation medium. Examples of the computer-readable medium would include the following: a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CR-ROM), and DVD.

A data processing system adapted for storing or executing program code would include at least one processor that is coupled to a memory element directly or via a system bus. The memory element may include a local memory usable during actually executing the program code, a mass memory, and a cache that provides temporary storage for at least one portion of program code so as to decrease the number of times for retrieving code from the mass memory during execution.

An Input/Output or I/O device (including, without limitation to, a keyboard, a display, a pointing device, etc.) may be coupled to the system directly or via an intermediate I/O controller.

A network adapter may also be coupled to the system such that the data processing system can be coupled to other data processing systems, remote printers or storage devices via an intermediate private or public network. A modem, a cable modem, and an Ethernet card are merely examples of a currently usable network adapter.

Though a plurality of embodiments of the present invention have been described above, those skilled in the art should understand that these depictions are only exemplary and illustrative. Based on the teachings and inspirations from the specification, modifications and alterations may be made to the respective embodiments of the present invention without departing from the true spirit of the present invention. Thus, the features in the specification should not be regarded as limitative. The scope of the present invention is only limited by the appended claims.

What is claimed is:

1. An apparatus for recording a context of configuration for an initial node of a cluster, comprising:
a memory device storing computer-readable instructions; and
a processor coupled to the memory device;
wherein the processor, when executing the computer-readable instructions, is configured to perform:
retrieving at least one file to be used for configuring the initial node; and
recording, at the initial node, a context of the initial node, the recoding being performed while configuring the initial node using the at least one file, the recorded context being information on the configuration of the initial node and to be used for enabling addition of a new node into the cluster, the context indicating at least one file to be retrieved from a file repository, at least one file to be retrieved from the initial node, a sequence of the retrieved files executed in the new node being added into the cluster, and dependencies indicating whether a retrieved file is to be run dependent upon execution of a preceding file; and
configuring the new node by concurrently retrieving files without a dependency, said configuring including running a retrieved file according to the sequence while concurrently retrieving a next file without a dependency from the file repository;
wherein the new node determines whether to record its own context; and
wherein the new node determines whether to record its own context based upon how many other sources of context are currently available in the cluster.

2. The apparatus according to claim 1, wherein the processor is further configured, when executing the computer-readable instructions, to record the context in a context repository associated with the cluster.

3. An apparatus for enabling addition of a new node into a cluster, comprising:
a memory device storing computer-readable instructions; and
a processor coupled to the memory device;
wherein the processor, when executing the computer-readable instructions, is configured to perform:
accessing, from an existing node of the cluster having recorded thereat a context of the existing node of the cluster, the context of the existing node of the cluster, the context being information on a configuration of the existing node, the accessing being performed while the new node is being added into the cluster, the context indicating at least one file to be retrieved from a file repository, at least one file to be retrieved from the existing node, a sequence of the retrieved files executed in the new node for the addition into the cluster, and dependencies indicating whether a retrieved file is to be run dependent upon execution of a preceding file; and
configuring the new node by concurrently retrieving files without a dependency, said configuring including running a retrieved file according to the sequence while continuously retrieving a next file without a dependency from the file repository;
wherein the new node determines whether to record its own context; and
wherein the new node determines whether to record its own context based upon how many other sources of context are currently available in the cluster.

4. The apparatus according to claim 3, wherein the processor is further configured, when executing the computer-readable instructions, to access the context from a context repository associated with the cluster.

5. The apparatus according to claim 3, wherein the processor is further configured, when executing the computer-readable instructions, to access the context from the existing node.

6. The apparatus according to claim 3,
wherein the processor is further configured, when executing the computer-readable instructions, to record a context while configuring the new node using the at least one file.

7. The apparatus according to claim 6, wherein the processor is further configured, when executing the computer-readable instructions, to record the context in a context repository associated with the cluster.

8. The apparatus according to claim 1, wherein the configuration includes installing an operating system mirror.

9. The apparatus according to claim 3, wherein the configuration includes installing an operating system mirror.

10. The apparatus according to claim 1, wherein communication between the initial node and the new node is carried out through a peer-to-peer communication.

11. The apparatus according to claim 3, wherein communication between the existing node and the new node is carried out through a peer-to-peer communication.

12. The apparatus according to claim 1, wherein the new node further determines whether to record its own context based upon a storage capacity of the new node.

13. The apparatus according to claim 3, wherein the new node further determines whether to record its own context based upon a storage capacity of the new node.

14. The apparatus according to claim 1, wherein the new node further determines whether to record its own context based upon a computing capacity of the new node.

15. The apparatus according to claim 3, wherein the new node further determines whether to record its own context based upon a computing capacity of the new node.

\* \* \* \* \*